US008260686B2

(12) United States Patent
Wirth, Jr.

(10) Patent No.: US 8,260,686 B2
(45) Date of Patent: *Sep. 4, 2012

(54) METHOD AND SYSTEM FOR CREATING A CUSTOMER SPECIFIC CUSTOM CATALOG ON A WEBSITE

(76) Inventor: John Wirth, Jr., Dubois, WY (US)

( * ) Notice: Subject to any disclaimer, the term of this patent is extended or adjusted under 35 U.S.C. 154(b) by 1449 days.

This patent is subject to a terminal disclaimer.

(21) Appl. No.: 11/763,120

(22) Filed: Jun. 14, 2007

(65) Prior Publication Data

US 2007/0239564 A1    Oct. 11, 2007

Related U.S. Application Data

(63) Continuation of application No. 10/253,894, filed on Sep. 25, 2002, now Pat. No. 7,472,082.

(51) Int. Cl.
*G06Q 30/00* (2012.01)
(52) U.S. Cl. ........................... 705/26.8; 705/27.1
(58) Field of Classification Search .............. 705/26.1, 705/26.8, 26.81, 27.1
See application file for complete search history.

(56) References Cited

U.S. PATENT DOCUMENTS

| | | |
|---|---|---|
| 3,796,487 A | 3/1974 | Voorhees |
| 5,440,401 A | 8/1995 | Parulski et al. |
| 5,721,832 A | 2/1998 | Westrope et al. |
| 5,799,157 A | 8/1998 | Escallon |
| 5,870,717 A | 2/1999 | Wiecha |
| 5,913,210 A | 6/1999 | Call |
| 5,960,411 A | 9/1999 | Hartman et al. |
| 6,029,141 A * | 2/2000 | Bezos et al. ............. 705/27.1 |
| 6,061,057 A | 5/2000 | Knowlton et al. |
| 6,397,143 B1 | 5/2002 | Peschke |
| 6,553,367 B2 | 4/2003 | Horovitz et al. |
| 6,557,006 B1 | 4/2003 | Headrick et al. |
| 6,678,695 B1 | 1/2004 | Bonneau et al. |
| 6,708,309 B1 | 3/2004 | Blumberg |
| 6,978,273 B1 | 12/2005 | Bonneau et al. |

(Continued)

FOREIGN PATENT DOCUMENTS

DE    10054728 A1    5/2002

(Continued)

OTHER PUBLICATIONS

LaGarde, "Stored Front" 5.0 (SE USer Guide) (at least Nov. 2001).*

(Continued)

*Primary Examiner* — Nicholas D Rosen
(74) *Attorney, Agent, or Firm* — Nixon & Vanderhye P.C.

(57) ABSTRACT

A method and system for creating and ordering from a Custom Catalog via an Internet catalog website is disclosed. A customer who is interested in only certain products included in a company's Internet product catalog can create a Custom Catalog that includes information about only those products in which the customer is interested. The customer provides certain identifying information, including the customer's e-mail address and a password that is linked to the e-mail address. Once the Custom Catalog is created, the customer can browse the company products displayed at the website and add them to his Custom Catalog. The purchaser can select products in the Custom Catalog and view detailed images of the selected products that include pricing and purchasing information for the products. The customer can also delete from his Custom Catalog those products no longer of interest.

36 Claims, 22 Drawing Sheets

U.S. PATENT DOCUMENTS

| | | | |
|---|---|---|---|
| 7,013,290 B2 | | 3/2006 | Ananian |
| 7,085,737 B2 * | | 8/2006 | Dan et al. .................... 705/80 |
| 7,266,516 B2 * | | 9/2007 | Song et al. ................ 705/26.62 |
| 7,308,421 B2 * | | 12/2007 | Raghupathy et al. ........... 705/20 |
| 7,472,082 B2 * | | 12/2008 | Wirth, Jr. ..................... 705/26.8 |
| 7,509,270 B1 * | | 3/2009 | Hendricks et al. .......... 705/26.9 |
| 7,797,271 B1 * | | 9/2010 | Bonneau et al. ............. 705/343 |
| 2001/0013096 A1 * | | 8/2001 | Luckenbaugh et al. ...... 713/154 |
| 2001/0049634 A1 | | 12/2001 | Stewart |
| 2002/0040330 A1 | | 4/2002 | Kido |
| 2002/0055891 A1 | | 5/2002 | Yang |
| 2002/0087434 A1 | | 7/2002 | Katano et al. |
| 2002/0087588 A1 | | 7/2002 | McBride et al. |
| 2002/0099591 A1 | | 7/2002 | Dyer |
| 2002/0111879 A1 | | 8/2002 | Melero et al. |
| 2002/0138370 A1 | | 9/2002 | Dan et al. |
| 2002/0141641 A1 | | 10/2002 | Zhu |
| 2002/0156688 A1 | | 10/2002 | Horn et al. |
| 2002/0156695 A1 | | 10/2002 | Edwards |
| 2003/0028451 A1 | | 2/2003 | Ananian |
| 2003/0083959 A1 | | 5/2003 | Song et al. |
| 2004/0006509 A1 | | 1/2004 | Mannik et al. |
| 2004/0006571 A1 | | 1/2004 | Anagol-Subbarao et al. |
| 2004/0204987 A1 | | 10/2004 | Hill et al. |
| 2004/0205006 A1 * | | 10/2004 | Kanai ............................. 705/26 |
| 2005/0091127 A1 | | 4/2005 | Saltel et al. |
| 2005/0125310 A1 | | 6/2005 | Hazi et al. |
| 2011/0060732 A1 * | | 3/2011 | Bonneau et al. ............. 707/722 |

FOREIGN PATENT DOCUMENTS

| | | | |
|---|---|---|---|
| FR | | 2738368 A1 | 3/1997 |

OTHER PUBLICATIONS

Jakob Nielsen's Alertbox for Nov. 1996: "Marginalia of Web Design".
Introduction to Dreamweaver 2.0 (Mar. 25, 2000).
Tutorial Overview for Dreamweaver (Nov. 1998).
University of South Carolina Computer Services, IT Training & Support,"Introduction to Adobe Acrobat 5" (Feb. 20, 2001).
Bizfinity, Inc., 2001, "bizfinity PRO Web Store Creator".
Dieter Weidenbruck, ITEDO Software, May 17, 1999, Electronic Catalogs, "The Current State of Technology".
"Features" Cart 2000, Intelligent Business Solutions (1998).
Cart 200 Demo Store Main Page, Intelligent Business Solutions (1998).
Esteve, Caroline "An approach for e-doc using XML technology" (Jun. 2000).
PHP and My SQL Web Development index pages for chapters 23-27, (Mar. 2001).
Itedo, ISO View—3.0 available now (Sep. 2001).
Jul. 16, 2005 Declaration of John Wirth with 10 attachments.
www.harolds.com archived 1998, found on www.archive.com.
"Microsoft Computer Dictionary", 1999, Microsoft Press, Fourth Edition, pp. 230 and 442.
www.lillianvernon.com, posted on the web on Oct. 25, found using www.archive.com's Wayback Machine.
www.bartswatersports.com; date available Oct. 1, 2000, as provided by www.archive.com.
Gralla, Preston, "How the Internet Works", Aug. 1999, Macmillan Computer Publishing, Millennium Edition, p. 127.
XML 2001, pp. 1-6/Bridging the Data Divide, pp. 1-17, Dec. 9-14, 2001.
Chapter 6: Images in Dreamweaver, pp. 1-20, Jun. 6, 2002.
NetStores FrontPage E-Commerce, pp. 1-4, Apr. 12, 2002.
Pressroom, PartsClerk.com and Savege Software Form Technology Partnership, pp. 1-2, Jun. 2002.
www.imagesecure.com/ingsplit.html archived Oct. 27, 2001, Image Splitter product available to the public Oct. 2001.
www.harolds.com, archived in 1998, same pages from the previous Office Action, used to show image maps.
Parkes, C.H., "PowerPlay 4.1; Impromptu 3.0," DBMS, vol. 9, No. 1, p. 34, Jan. 1996.
Winnett, R., "Internet Opens Up Window Shopping," Times of London, Features Section, Nov. 8, 1998.
Frean, A., "Groceries Go Off Their Trolley; Internet Shopper," Times of London, Features Section, Mar. 3, 1999.
Anon., "Smith-Gardner Launches Online Merchandising Tool to Increase Conversion Rate of Web Browsers to Buyers," Business Wire, p. 1127, Oct. 6, 1999.
Anon., "Software Spectrum Introduces New E-Services; Helps Companies Better Manage Software Procurement Through the Internet," Business Wire, Jun. 21, 2000.

* cited by examiner

CATALOG COMPANY NAME

31

Browse Print Catalogs · Browse Products By Categories
Create/Edit Your Settings · Home · Help · Login
Check-out · Close-outs · Contact Us · Your Cart
Specials · Wish List · Your Custom Catalog · Your Projects

33

39

Red Hot Specials

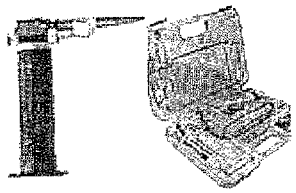

New Products

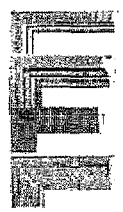

Specials

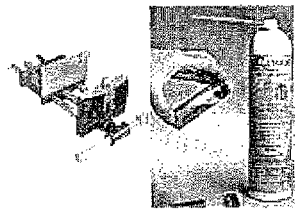

Closeouts

Choose one of the following, or
Browse our complete category listing

  

Machinery · Power Tools · Machinery & Power Tool Accessories

  

Router Bits · Saw Blades · Drilling & Boring

  

Abrasives · Finishing & Adhesives · Shop Accessories

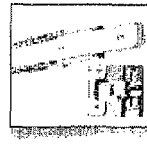  

Drawer Slides & Hinges · Fasteners · Cabinet & Furniture Hardware

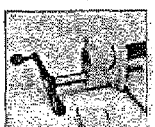  

Clamps and Vises · Hand Tools · Wood Specialties

CATALOG COMPANY NAME

Browse Print Catalogs · Browse Products By Categories
Create/Edit Your Settings · Home · Help · Login
Check-out · Close-outs · Contact Us · Your Cart
Specials · Wish List · Your Custom Catalog · Your Projects

---

You have reached a feature of the Website that requires additional information in order to proceed. Please select from one of the following options.

41

43 →

If you have NOT yet SETUP your CHECKOUT/WEBSITE settings, Please CLICK Here

Option 1   [ Create New Checkout/Website Settings ] — 49

You will be prompted for information needed to process your order. (Email address, Shipping address, Preferred Shipping method, Etc...) This will enable you to use the advanced features of the Website, including our Kwik Klik® Checkout.

If your settings are already setup, Please LOGIN Here

45 →

Option 2   Enter your Email Address [       ] — 51

Enter your Password [       ] — 53

Note: PASSWORD IS CASE-SENSITIVE.

[ Sign In with our Secure Server ] — 55

47 →

Option 3   If you do not remember your password, enter your email address in the box below and click.

57 → [       | Send Reminder ] — 59

Fig. 4A

CATALOG COMPANY NAME

Browse Print Catalogs · Browse Products By Categories
Create/Edit Your Settings · Home · Help · Login
Check-out · Close-outs · Contact Us · Your Cart
Specials · Wish List · Your Custom Catalog · Your Projects

---

Incorrect Login Attempt ← 59

You have reached a feature of the Website that requires additional information in order to proceed. Please select from one of the following options.

41

If you have NOT yet SETUP your CHECKOUT/WEBSITE settings, Please CLICK Here

41 ↘

Option 1   | Create New Checkout/Website Settings | ← 47

You will be prompted for information needed to process your order. (Email address, Shipping address, Preferred Shipping method, Etc...) This will enable you to use the advanced features of the Website, including our Kwik Klik® Checkout.

If your settings are already setup, Please LOGIN Here

43 →  Enter your Email Address [        ] ← 49

Option 2   Enter your Password [        ] ← 51

Note: PASSWORD IS CASE-SENSITIVE.

| Sign In with our Secure Server | ← 53

45 →

Option 3   If you do not remember your password, enter your email address in the box below and click.

55 ↗ [                | Send Reminder ] ← 57

Fig. 4B

CATALOG COMPANY NAME

Browse Print Catalogs · Browse Products By Categories
Create/Edit Your Settings · Home · Help · Login
Check-out · Close-outs · Contact Us · Your Cart
Specials · Wish List · Your Custom Catalog · Your Projects Required fields are underlined    CREATE CHECKOUT SETTINGS

| | | |
|---:|:---|:---|
| E-mail Address: | _____ | ~23 |
| E-mail Address Confirmation: | _____ | ~24 |
| 63 → (minimum of 6 characters maximum of 30) Password: | _____ | ~25    61 |
| Password Confirmation: | _____ | ~26 |
| Password Reminder Phrase: (Reminds you of your Password) | _____ | ~27 |

BILLING / SHIPPING ADDRESS

| | |
|---:|:---|
| Name Prefix: | [Prefix ▼] |
| First Name: | _____ |
| Middle Name: | _____ |
| Last Name: | _____ |
| 65  Name Suffix: | [Suffix ▼] |
| Title: | _____ |
| Attention: | _____ |
| Address: | _____ |
| Address: | _____ |
| City: | _____ |
| Zip/Postal Code: | _____ |
| State/Province (APO/FPO/etc.): | [State ▼] |
| Country: | [UNITED STATES ▼] |
| Preferred Ground Ship Method: | [Economy ▼] |
| Phone Number (with area code): (Enter number with or without dashes, spaces, etc.) 67 → | _____ |
| Phone Extension: | _____ |
| Mail Catalog to this Address: | ☑ |

69 → [ Continue to Confirmation Screen ] ~71

Fig. 5A

CATALOG COMPANY NAME

29 — Browse Print Catalogs · Browse Products By Categories
Create/Edit Your Settings · Home · Help · Login — 33
Check-out · Close-outs · Contact Us · Your Cart
Specials · Wish List · Your Custom Catalog · Your Projects Required fields are underlined                                    View our Privacy
                                                                         Policy
CREATE CHECKOUT SETTINGS
BILLING / SHIPPING ADDRESS
Confirmation of Checkout Settings
                                                                      73

|  |  |
|---:|:---|
| Email Address: | smith@company.com |
| Password: | hidden |
| Reminder Phrase: | mother's maiden name |
| Name: | Mr. John Smith |
| Address: | 123 Anywhere Ct. |
| City: | Anywhere |
| State: | AB |
| Zip/Postal Code: | 12345 |
| Country: | USA |
| Phone: | 123-456-7890 |
| Default Ground Shipping Method: | Ground |
| Mail Catalog: | Yes — 81 |

75 → (Email Address, Password)
77 → (Address)
79 → (Country)

| Confirmation Complete, Save my Checkout Settings |
|---|

Fig. 5B

CATALOG COMPANY NAME

Browse Print Catalogs · Browse Products By Categories
Create/Edit Your Settings · Home · Help · Login
Check-out · Close-outs · Contact Us · Your Cart
Specials · Wish List · Your Custom Catalog · Your Projects

| Del | Catalog Number(click for detail) | Description | Price | Qty |
|---|---|---|---|---|

John Smith

Your Custom Catalog®

Fig. 6A

CATALOG COMPANY NAME

Browse Print Catalogs · Browse Products By Categories
Create/Edit Your Settings · Home · Help · Login
Check-out · Close-outs · Contact Us · Your Cart
Specials · Wish List · Your Custom Catalog · Your Projects John Smith Your Custom Catalog®

| Del | Catalog Number(click for detail) | Description | Price | Qty |
|---|---|---|---|---|
| X | 937-866 | | ($ 134.99 1+) | |
| Adhesives/ instant | | | | |
| X | 913-721 | LIGHTNING BOND SUPER GEL | ($ 7.95 1+) ($ 6.95 2+) | |
| Finishing supplies/ knives & spatulas | | | | |
| X | 930-771 | SPATULA SET | ($ 16.99 1+) | |
| Plans/ book case | | | | |
| X | 107-690 | BOATING BOOKSHELVES PLAN | ($ 9.95 1+) | |
| Plans/ toys | | | | |
| X | 897-219 | MOTORCYCLY ROCKER PLANS | ($ 14.95 1+) | |
| Wood specialties/ toy parts | | | | |
| X | 110-265 | LITTLE GENTLEMEN | ($ 0.44 1+) | |
| X | 110-266 | LITTLE LADIES | ($ 0.35 1+) ($ 0.30 20+) MixMatch | |
| X | 824-368 | MINI BARREL | ($ 0.26 1+) | |

Fig. 6B

CATALOG COMPANY NAME

98 — Browse Print Catalogs · Browse Products By Categories
Create/Edit Your Settings · Home · Help · Login
Check-out · Close-outs · Contact Us · Your Cart
Specials · Wish List · Your Custom Catalog · Your Projects

← 33

Select Any Catalog and Click to View and Shop On-Line

| WINTER II #160 | SPRING I 2001 #161 | SPRING II #162 | FATHER'S DAY #163 | SUMMER SALE #165 |
| FALL I #166 | HOLIDAY I 2001 #167 | HOLIDAY I 2001 #168 | WINTER I 2002 #169 *SELECTED* | |

Select Any Catalog and Click to View and Shop On-Line

← 105
103

The Latest Woodworker catalogs are available here

Use List below to Select and View Pages

2 Red Hot Savings

WINTER I 2002 #169 *SELECTED*

CATALOG COMPANY NAME

Browse Print Catalogs · Browse Products By Categories
Create/Edit Your Settings · Home · Help · Login
Check-out · Close-outs · Contact Us · Your Cart
Specials · Wish List · Your Custom Catalog · Your Projects

NEW JIGSAW HAS UNTOUCHABLE FEATURES — 116

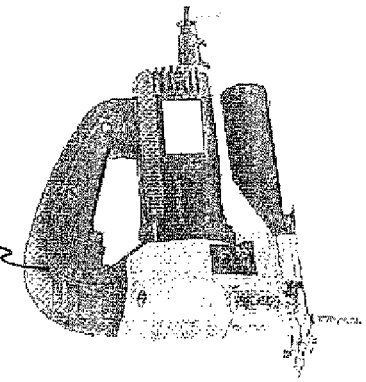

114

Click for Larger Image

— 115

Now with a whopping 6 amps of power! Plus an electronic feedback system that allows the speed to remain constant under load, a feature no other jigsaw has. Variable speed from 500 to 3,000 strokes per minute combines with four orbit settings, the dust extraction port, tool free blade changes, and the non-marring baseplate to make this one of the handiest, easiest to use, and most effective jigsaws around.

| Catalog Number | Description | Brand | Model | OnHand | Unit | Pricing | Add to Cart | Wish List | Custom Catalog | Project List —117 |
|---|---|---|---|---|---|---|---|---|---|---|
| 913-798 (FJ85) | TOP HANDLE JIGSAW | XYZ | FJ85 | 7 | EA | $ 108.89 | 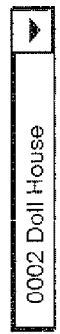 | ☐ | ☐ 118 | ☐ |

Currently Selected Project is: [ 0002 Doll House ▸ ]

CATALOG COMPANY NAME

Browse Print Catalogs · Browse Products By Categories
Create/Edit Your Settings · Home · Help · Login
Check-out · Close-outs · Contact Us · Your Cart
Specials · Wish List · Your Custom Catalog · Your Projects

AUTHENTIC LOOKING BOAT BOOK SHELVES — 116A

— 115A

Using common woodworking tools and fairly good woodworking skills, this conversation starter can be built relatively inexpensively. Perfect for holding books, collectibles, or other knick knacks. Finished size is 73" high, 26" wide, 13" deep.

Click for Larger Image

114A

| Catalog Number | Description | OnHand | Unit | Pricing | Add to Cart | Wish List | Custom Catalog | Project List |
|---|---|---|---|---|---|---|---|---|
| 107-690 | BOATING BOOKSHELVES PLAN | 29 | EA | $ 9.95 |  | ☐ | ☒ | ☐ |

117 ↗
119
118

Currently Selected Project is: [ 0002 Doll House ▼ ]

CATALOG COMPANY NAME — 33

Browse Print Catalogs · Browse Products By Categories
Create/Edit Your Settings · Home · Help · Login
Check-out · Close-outs · Contact Us · Your Cart
Specials · Wish List · Your Custom Catalog · Your Projects

| | Machinery/ table saws | | | |
|---|---|---|---|---|
| Del | Catalog Number(click for detail) | Description — 125 | Price | Qty — 101 |
| ⊗ | 103-616 | CONTRACTORS SAW W/JET FENCE | ($ 699.00 1+) | ☐ [ADD] |
| ⊗ | 103-637 | CONTRACTORS SAW W/XACTA LIFT | ($ 1149.99 1+) | ☐ [ADD] — 126 |
| ⊗ | 103-640 | CONTRACTORS SAW W/XACTA LIFT | ($ 1049.99 1+) | ☐ [ADD] |
| John Smith | | | | |
| Your Custom Catalog® | | | | |

CATALOG COMPANY NAME ~33

Browse Print Catalogs · Browse Products By Categories ·
Create/Edit Your Settings · Home · Help · Login ·
Check-out · Close-outs · Contact Us · Your Cart ·
Specials · Wish List · Your Custom Catalog · Your Projects

| | Machinery/ table saws ~125 | | 126 | 101, 127 |
|---|---|---|---|---|
| Del | Catalog Number(click for detail) | Description | Price | Qty |
| ⊗ | 103-616 | CONTRACTORS SAW W/JET FENCE | ($ 699.00 1+) | 2 [ADD] |
| ⊗ | 103-637 | CONTRACTORS SAW W/XACTA LIFT | ($ 1149.99 1+) | [ADD] |
| ⊗ | 103-640 | CONTRACTORS SAW W/XACTA LIFT | ($ 1049.99 1+) | [ADD] |

John Smith

Your Custom Catalog®

CATALOG COMPANY NAME

Browse Print Catalogs · Browse Products By Categories
Create/Edit Your Settings · Home · Help · Login
Check-out · Close-outs · Contact Us · Your Cart
Specials · Wish List · Your Custom Catalog · Your Projects  — 33

Manually add an Item to Shopping Cart:==> Item Number [       ] Qty [    ] [ADD]

| Checkout Settings Management | | | | | KWIK KLIK™ CHECKOUT | | |
|---|---|---|---|---|---|---|---|
| Remove | Catalog Number | Description | Unit | Unit Price | Qty | | Extended Price |
| X | 102-053 | 8"X40T GENERAL PURPOSE BLADE | EA | $94.99 | 1 | ⱱ⊕ | $94.99 |
| X | 103-616 | ● CONTRACTOR SAW W/JET FENCE | EA | $699.00 | 1 | ⱱ⊕ | $699.00 |
| | | Merchandise Total | | | $ | | 793.99 |
| | | Packing & Insured Delivery | | | $ | | 12.45 |
| | | Motor Freight Charges | | | $ | | 55.00 |
| | | Order Sub Total | | | $ | | 861.44 |

[CONTINUE BROWSING] — 137    [Click to Begin Checkout Process] — 138

Manually add an Item to Shopping Cart:==>  Item Number [       ] Qty [    ] [ADD]

CATALOG COMPANY NAME

Browse Print Catalogs · Browse Products By Categories
Create/Edit Your Settings · Home · Help · Login
Check-out · Close-outs · Contact Us · Your Cart
Specials · Wish List · Your Custom Catalog · Your Projects ⟵ 33

Manually add an Item to Shopping Cart:==> Item Number [ ]  Qty [ ]  [ADD]

[Checkout Settings Management]

| Remove | Catalog Number | Description | Unit | Unit Price | Qty | Extended Price |
|---|---|---|---|---|---|---|
| X | 102-053 | 8"X40T GENERAL PURPOSE BLADE | EA | $94.99 | 1 | $94.99 |
| X | 103-616 | ● CONTRACTOR SAW W/JET FENCE | EA | $699.00 | 2 | $1398.00 |

KWIK KLIK™ CHECKOUT — 134A / 135A

| | | | | Merchandise Total | $ | 1492.99 |
| | | | | Packing & Insured Delivery | $ | 12.45 |
| | | | | Motor Freight Charges | $ | 110.00 |
| | | | | Order Sub Total | $ | 1615.44 | ⟵ 136A

131 ⟵ 132, 133

[CONTINUE BROWSING] — 137    [Click to Begin Checkout Process] — 138

Manually add an Item to Shopping Cart:==> Item Number [ ]  Qty [ ]  [ADD]

METHOD AND SYSTEM FOR CREATING A CUSTOMER SPECIFIC CUSTOM CATALOG ON A WEBSITE

This application is a continuation of U.S. patent application Ser. No. 10/253,894, filed Sep. 25, 2002, (now U.S. Pat. No. 7,472,082), the entirety of which is incorporated by reference herein.

FIELD OF THE INVENTION

Background of the Invention

The present invention relates to catalog shopping, and, in particular, to a method and system for creating and browsing a Custom Catalog of products via the Internet.

Historically, people have shopped from the comfort of their homes (or offices) using printed paper catalogs. The traditional printed catalog typically is a multi-page book containing a large array of product pictures and descriptions and detailed information for purchasing such products.

Each page of a typical printed catalog page may include a title, which is the category of products presented on the page, and number of presentations for products appearing within the category name. Typically, each presentation includes a picture of the product, a headline defining the benefits of the product, copy beneath the headline describing various features of the product, including, for example, size, color and weight, and detailed information and pricing for ordering the product from the catalog company.

Also included in a typical printed catalog is an order form for purchasing selected products using the ordering information. The ordering information for desired products is placed on the order form, which is then mailed to the catalog company. Alternatively, a purchaser can call what is typically a toll-free number to speak to a catalog company representative who takes the information for processing product purchases.

More recently, the internet has become a vehicle for electronic commerce and a viable alternative for in home (or office) purchases of products from companies that maintain a website from which product information may be obtained and products ordered. Many company websites include an electronic version of the company's paper product catalogs. These electronic catalogs typically include a "page" index and electronic versions of the "pages" comprising the catalog. The page numbers listed in the page index are hyperlinks which, when clicked by a customer, cause a file for a requested catalog page to be retrieved for display on a customer's computer.

The internet is a global communications system in which a vast number of computers and other devices are networked to allow customer-to-customer communications and transfers of data files from one machine to any other on the network. The World Wide Web serves as one type of interface to the Internet that allows customers to readily navigate the Internet's vast resources. The Web allows information and data dispersed across the Internet to be linked in an easily accessible way. This information or data typically includes text, graphics, illustrations, sound and video.

The World Wide Web uses a client/server architecture in which client programs, called web browsers, running on customers' computers request data from server programs running on other computers known as servers, which are located elsewhere on the Internet. The data requested by a customer's browser is typically part of a website maintained by a company or other entity. When the browser program requests the data, a web server hosting the website sends the requested data back over the Internet to the browser, which then interprets and displays the data on the customer's computer screen. Thus, a web browser is a computer program or application that has the ability to request data from any server on the Internet and interpret and display on a customer's computer the data sent by a server through the Internet. Conversely, a web server is a computer program that responds to web browser requests for data and sends the requested data to the web browser through the Internet.

A web page is typically a file that contains HTML (hypertext mark-up language) files containing text and graphics, along with a set of HTML tags that describe how the text and graphics should be formatted and displayed on a customer's computer screen. The tags are instructions that tell the web browser how the page should look when it displays the page on a customer's computer. So, for example, the tags serve to change the font size or color, arrange things in columns, etc. The graphics or images on web pages are typically either GIF files or JPG files. The GIF files are generally used for drawn graphics, while the JPG files are generally used for photographs or scanned images.

The World Wide Web uses an addressing system known as a Uniform Resource Locator (URL). A URL consists of four parts that, when combined, completely define the location of any file or service located anywhere on the Internet. These parts are the protocol, domain name, path, and filename. Thus, a customer's browser, in requesting a web page from a website, sends a message over the Internet that includes at least a transfer protocol (e.g., http://), and a domain name (e.g., www.catalogcompanyname.com). The last two components of a URL may or may not exist, depending on the location and type of information any given hyperlink points to. The server receives the customer's request and retrieves the requested web page or other file, which is composed in HTML. The server then transmits the requested page or other file back across the Internet to the customer's computer. The customer's browser program receives the HTML file and displays its interpretation of the requested file. Thus, browser programs send requests and receive the data needed to display the HTML page on a customer's screen. This includes the HTML file itself, plus each of the graphic, sound and video files mentioned in the HTML file. Once the data is retrieved, the browser formats the data as indicated by the HTML tags and displays it on the customer's computer screen.

Web pages are typically hypertext documents, i.e., documents which provide clearly visible links to other documents or web pages on the World Wide Web. When a customer clicks on a hypertext link, or hyperlink, a new request to retrieve another file is sent over the Internet. With a web browser, a customer typically sees formatted documents that contain text, graphics and highlighted hyperlinks. The browsers let a customer navigate the Internet, not by entering commands, but rather by moving a mouse pointer to a desired hyperlink and clicking. The browser establishes contact with the related server in a remote computer, and the server transfers the requested file to the customer's machine, displaying it in the customer's browser as another formatted, hyperlink document. Thus, a customer can "surf" the web by hopping from hyperlink to hyperlink without delving deeply into the contents of any particular document.

Customers connect to the Internet typically via a modem dial-up connection to an Internet Service Provider, although some connect via a direct line such as a T1 or a T3 line. Most modem dial-up connections occur over regular phone lines. These analog lines have limited bandwidth, which limits the rate of speed at which data can be transferred from the Internet to a customer's computer. Common transfer rates for modems used with analog phone lines are 28.8 and 56 Kbps. With a rate of data transfer of 28.8 Kbps, the download of a typical window screen consisting of 50 KBytes of data can take as much as 13 seconds, while a 1 MegaByte image file at the same data transfer speed could take as much as 5 minutes. Thus, where you have a customer who is looking to download multiple catalog web pages, each of which contains multiple graphical images per page, a significant amount of time can be spent by the customer waiting for the download of each page, not to mention a number of catalog pages.

It is possible to reduce download time by subscribing to an improved connection service, such as ISDN (Integrated Services Digital Network) or DSL (Digital Subscriber Line). While such services allow for faster download times, they are not available in many locations, such as the rural locations where persons who traditionally use catalogs to shop live. Moreover, there is an additional expense to a customer of these services, which may not be affordable or justified, given the purpose for which a customer's computer and Internet connection may be used. This may be particularly the case where a customer operates his or her computer and Internet connection for personal purposes only.

BRIEF DESCRIPTION OF THE INVENTION

The present invention is a method and system for creating and ordering from a Custom Catalog via the Internet which overcomes the time limitations associated with downloading multiple pages of an internet catalog using a typical modem dial-up connection to the Internet. According to the present invention, an Internet customer/catalog customer who is interested in only certain products included in a company's catalog is given the option of creating a Custom Catalog that includes information about only those products in which the customer is interested. A customer's Custom Catalog is first created by the customer providing certain identifying information, including the customer's e-mail address and a password that is linked to the e-mail address. Once the Custom Catalog is created, the customer can browse the company products displayed at the website and add them to his or her Custom Catalog. The customer can also view detailed images of the selected products that include pricing and purchasing information for the products. The customer can also delete from his Custom Catalog at anytime those products no longer of interest. While product catalogs are typically directed to physical items offered for sale by a catalog company, the present invention also contemplates a broader definition of "products" that may include, for example, services or non-tangible items that may be offered by a company as its products.

Once a customer includes in his Custom Catalog a product in which he is interested, the customer can request more detailed information about the particular product by clicking on a hyperlink that connects the customer to another file containing such detailed information. The hyperlink, which is embedded in the Custom Catalog page, corresponds to the entire presentation of the product listed on the Custom Catalog page. When a customer clicks on a hyperlink corresponding to a particular product, a more detailed presentation for that product is provided. A description of a system and method for providing a low resolution catalog page presentation and a more detailed product presentation is described in copending patent application Ser. No. 10/004,107, filed Dec. 6, 2001. The more detailed presentation is transmitted by the catalog web server to the customer over the Internet, after which the customer's browser receives the detailed presentation file and displays it in the customer's computer according to the format contained in the more detailed file. If the customer decides to buy the product, another hyperlink in the detailed presentation is then clicked to obtain another file in which information for ordering the product is stored. If the customer chooses to not buy the product, then he or she has the option of returning to his Custom Catalog previously being viewed, after which the detailed presentation for another product listed on his Custom Catalog page can be requested by clicking on the hyperlink for that product. Alternatively, the customer can exit from his Custom Catalog to view other aspects of the company's product catalog web page.

BRIEF DESCRIPTION OF THE DRAWINGS

FIG. 3 is a sample of a main web page for a product catalog company.

FIG. 4A is another web page linked to the main web page of FIG. 3 through which a customer provides checkout/website settings that allow the customer to use the Custom Catalog of the present invention.

FIG. 4B is the same page shown in FIG. 4A, but with an indication that an incorrect log-in attempt has been made by a customer.

FIG. 5A is another web page linked to the web page of FIG. 4A through which a customer provides information for setting up his check out/website settings that allow the customer to use the Custom Catalog of the present invention.

FIG. 5B is a confirmation web page for confirming the information provided by the customer in the web page of FIG. 5A.

FIG. 6A is a web page linked to the main web page of FIG. 3 which is a display of a customer's Custom Catalog, but without any products included in the catalog.

FIG. 6B is a page linked to the main web page of FIG. 3 which is a display of a customer's Custom Catalog that includes products selected by the customer for the catalog.

FIG. 7 is a further web page linked to the main web page of FIG. 3 through which a customer requests a desired product catalog and particular pages of a selected product catalog.

FIG. 8B is a detailed presentation of a selected one of the products shown on the low resolution image catalog page of FIG. 8A.

FIG. 9 is a detailed presentation of a product that has been selected from a customer's Custom Catalog for detailed viewing.

FIG. 10A is another web page linked to the main web page of FIG. 3 which is a display of another customer's Custom Catalog.

FIG. 10B is another web page linked to the main web page of FIG. 3 which is a display of another customer's Custom Catalog that includes a multiple quantity for one of the products listed in the catalog.

FIG. 11A is a web page linked to the Custom Catalog web page of FIG. 10A for purchasing selected products which include a product listed on the customer's Custom Catalog.

FIG. 11B is a web page linked to the Custom Catalog web page of FIG. 10A for purchasing selected products which include more than one of a product listed on the customer's Custom Catalog.

DETAILED DESCRIPTION OF THE INVENTION

Figure 1:
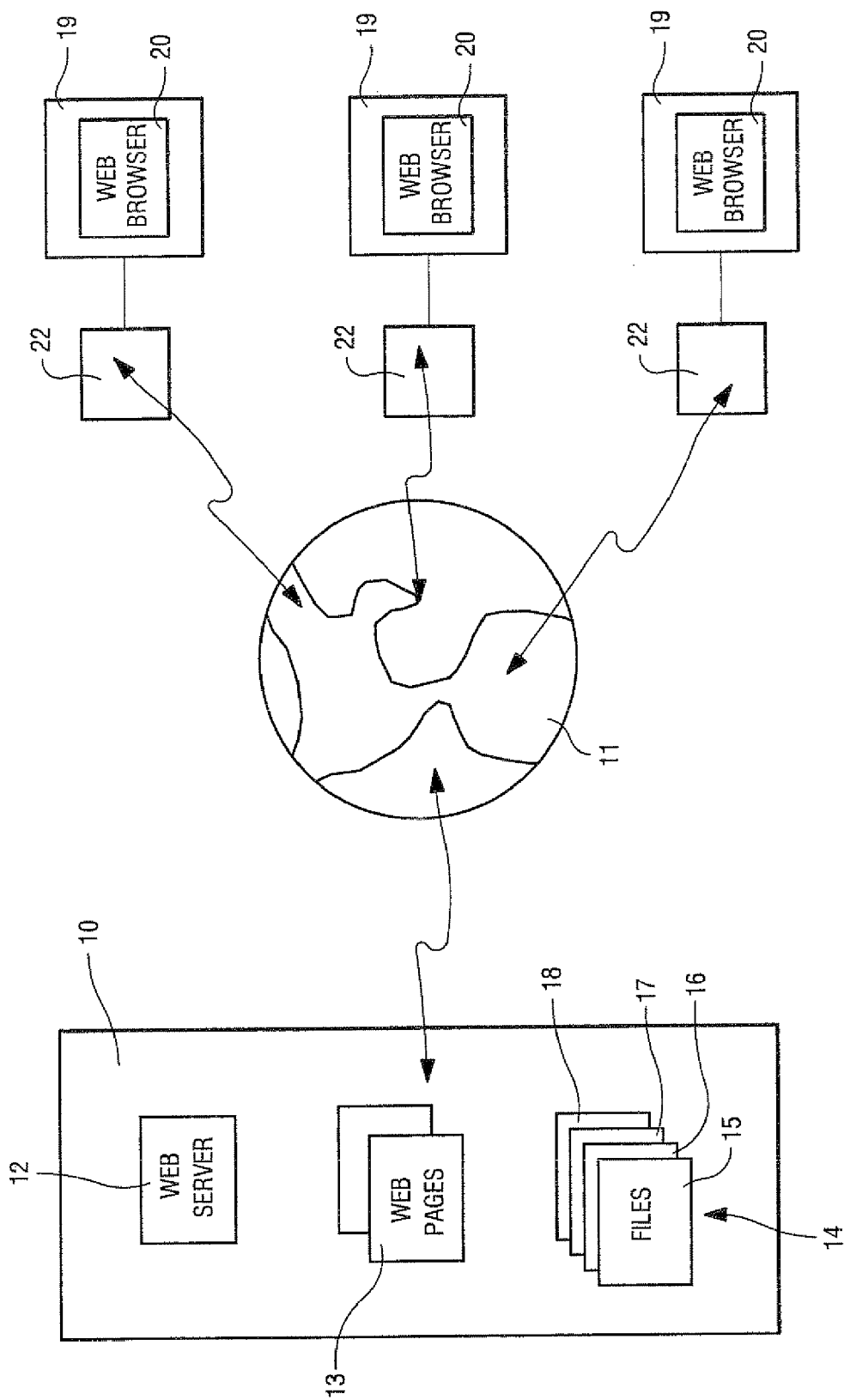
FIG. 1 is a block diagram of a system for carrying out the catalog browsing and ordering method of the present invention.

FIG. 1 is a block diagram illustrating a system for carrying out the present invention. Shown in FIG. 1 is a server computer system 10 connected to the Internet 11. Stored in the memory (not shown) of computer 10 is a web server program 12 and a plurality of files 14 relating to a Custom Catalog feature of a product catalog web page 13. Constituting the plurality of files 14 are a first series of files 15, which are e-mail addresses of customers using the product catalog, a second series of files 16 which are corresponding passwords of customers using the product catalog web page 13, a third series of files 17 which are password reminder phrases to assist customers in remembering their passwords, and a fourth series of files 18 which are various customers' Custom Catalogs.

Also shown in FIG. 1 are several customer systems 19, each of which can be, for example, a television with Internet access, but which is preferably a personal computer with a modem 22 for connecting to the Internet 11. Stored in each computer 19's memory (not shown) is a web browser program 20 for requesting information from web servers, such as web server 12. The customer systems 19 are each typically operated by a customer desiring to browse, and perhaps order products from, a catalog web page.

Although not specifically shown in FIG. 1, computers 10 and 19 would typically include central processing units (CPUs) and system buses that would couple various computer components to the CPUs. These system buses may be any of several types of bus structures, including a memory bus or memory controller, a peripheral bus, and a local bus using any of a variety of bus architectures. The memory used by computers 10 and 19 would also typically include random access memory (RAM) and one or more hard disk drives that read from, and write to, (typically fixed) magnetic hard disks. A basic input/output system (BIOS), containing the basic routines that help to transfer information between elements within a personal computer system, such as during start-up, may also be stored in read only memory (ROM). Computers 10 and 19 might also include other types of drives for accessing other computer-readable media, such as a removable "floppy" disks, or an optical disk, such as a CD ROM. The hard disk, floppy disk, and optical disk drives are typically connected to a system bus by a hard disk drive interface, a floppy disk drive interface, and an optical drive interface, respectively. The drives and their associated computer-readable media provide nonvolatile storage of computer-readable instructions, data structures, program modules, and other data used by machines, such as computers 10 and 19. Computer 10 will also include a communications device (not shown) for connecting to Internet 11. Such communications device and modems 22 may be internal or external, and are typically connected to the computer's system bus via a serial port interface. Computers 10 and 19 may also include other typical peripheral devices, such as printers, displays and keyboards. Typically, computer 18 would include a display monitor (not shown) on which various catalog pages and other catalog information are displayed.

FIGS. 2A-2E show a flow diagram of a method of creating and using the Custom Catalog of the present invention. The first step 30 is for a customer to log onto the catalog company's website. When a customer enters the catalog company's URL in his or her web browser 20, the customer is then presented with the web page 31 shown in FIG. 3. Web page 31 is only one example of a main web page that might be presented by a catalog company. The particular embodiment of web page 31 shown in FIG. 3 includes the catalog company's name and a number of hyperlinks 33 in the form of word phrases that allow a customer to access other features of the catalog company's website. These hyperlinks include a hyperlink 39 that allows a customer to access and use the Custom Catalog of the present invention. Also shown in FIG. 3 as part of web page 31 are a number of picture hyperlinks 35 and 37. Picture hyperlinks 35 allow a customer to browse products offered by the catalog company according to a category listing. Thus, for example, if a customer is interested in hand tools, he or she can click on the particular hyperlink relating to those types of products.

The picture hyperlinks 37 allow a customer to access other types of products offered by the catalog company, such as specials, new products and close-out products. The types of hyperlinks shown by way of example in FIG. 3 are not intended to be exhaustive and can include other features of interest to customers that might potentially access the catalog company's website.

Referring again to FIG. 2A, the next step 32 is for a customer to select the Custom Catalog option on main web page 31. This would be done by the customer clicking on the Custom Catalog hyperlink 39 shown in FIG. 3. The clicking of hyperlink 39 brings the customer to another web page 41 in the catalog company website shown in FIG. 4A through which a customer accesses his Custom Catalog. At step 34 of FIG. 2A, the customer indicates whether he has previously set up the Custom Catalog feature at the catalog company's website. Web page 41 displays to the customer three options. The first option 43 allows a customer to set up checkout/website settings that will allow the customer to use the Custom Catalog feature. The screen 61 shown in FIG. 5A for the setup is accessed by clicking on button 49 associated with the first option 43.

Figure 2A:
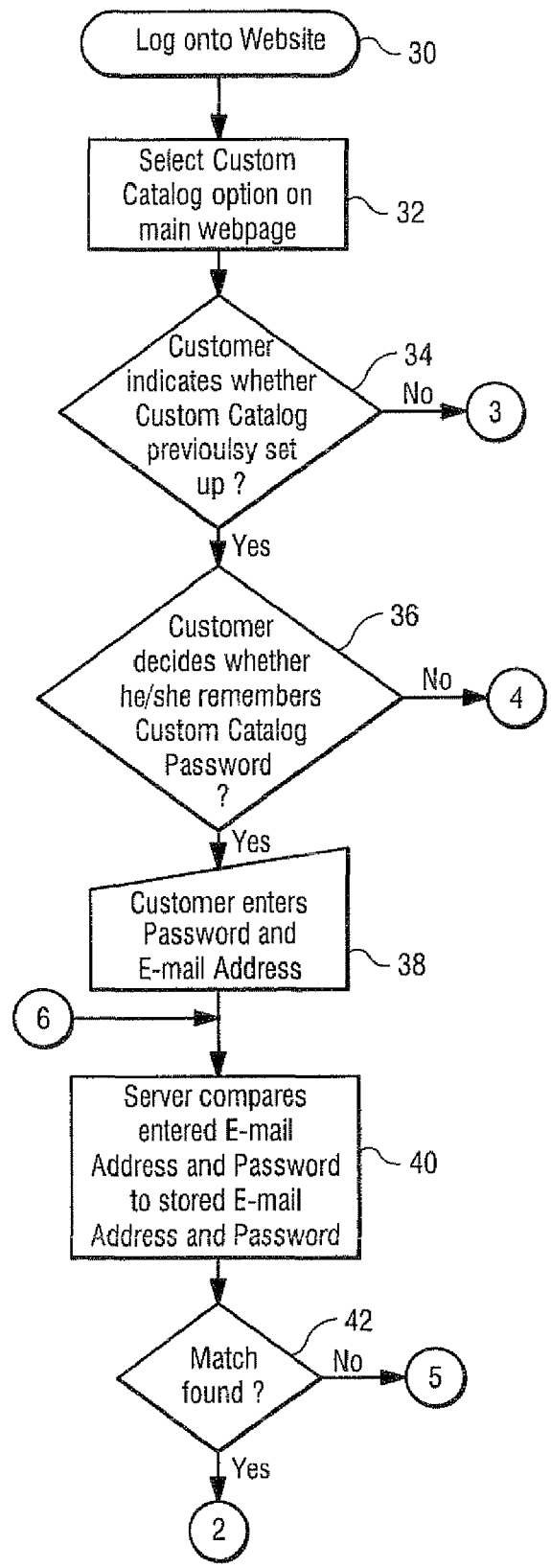
FIGS. 2A to 2E are flow diagrams describing the method of creating a Custom Catalog according to the present invention.
Figure 2B:
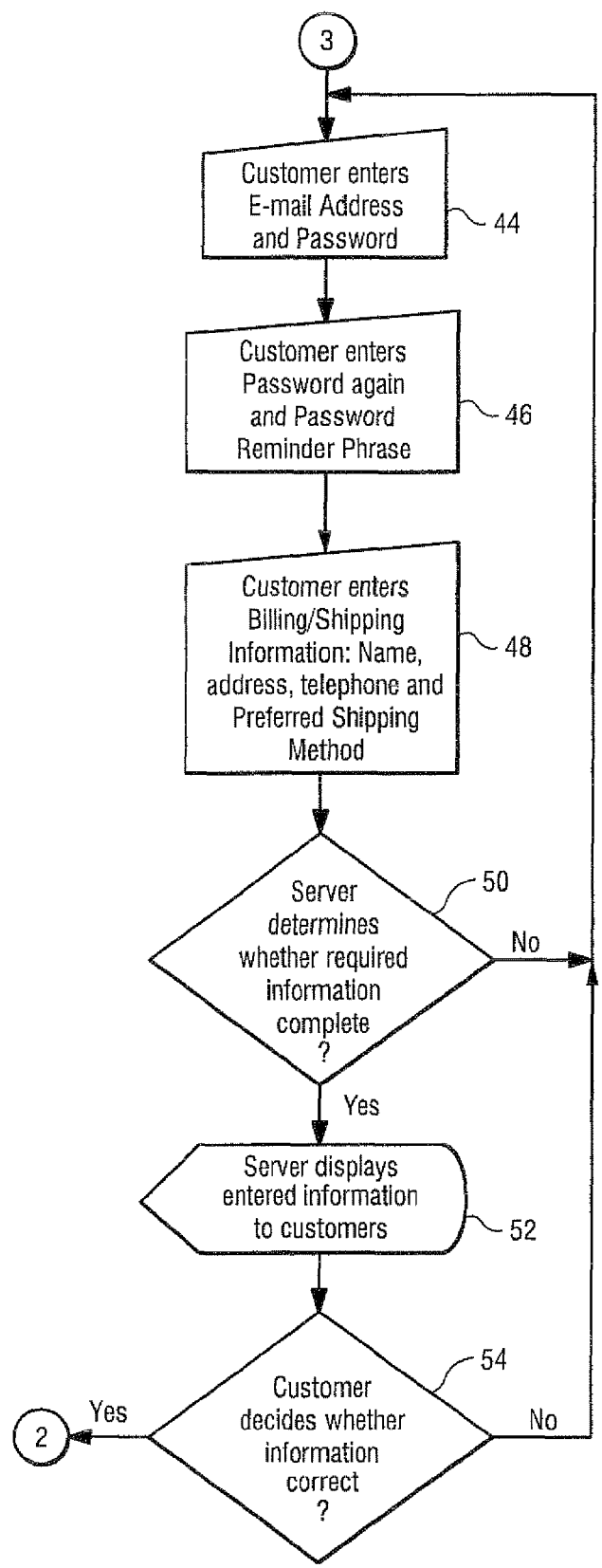

Referring now to FIGS. 2B and 5A, if the customer at step 34 determines that he has not previously set up the Custom Catalog features, the customer enters the information required by the checkout settings part 63 of the web page 61 shown in FIG. 5A. At step 44 of FIG. 2B, the customer enters his e-mail address in the field 23 provided in page 61. This address is confirmed by the customer re-entering his e-mail address in the field 24 immediately under field 23. At step 46, the customer enters a password in the field 25 provided for this purpose. In the embodiment shown in FIG. 5A, the password is described as a minimum of 6 characters and a maximum of 30, although it is to be understood that alternative password schemes could be used. The password is then confirmed by the customer re-entering the password in field 26. Finally, the customer provides in field 27 a password reminder phrase to assist the customer in remembering his password, should he forget it in the future.

At step 48 of FIG. 42B, the customer enters certain billing and shipping information in the fields provided in part 65 of the web page 61 of FIG. 5A. This information includes the customer's name and address. In the fields provided in part 67 of page 61, the customer enters his preferred method of shipment and telephone number. The information request at web page 61 also includes an indication in field 69 as to whether the customer wishes to receive by mail a paper catalog from the catalog company. The information is then confirmed by the customer clicking button 71, whereupon at step 50 web server 12 determines whether all the required information is complete. If it is not, the web server returns to step 44 to request the customer to enter the required information. If it is complete, at step 52, web server 12 displays the entered information, as shown on page 73 (FIG. 5B) of the catalog company's website. The confirmed information includes the e-mail address and the reminder phrase shown in the fields of part 75 of screen 73. The password is typically is not disclosed, although in a different arrangement, it could be. The customer's name and mailing address are also shown in the fields of part 77 of screen 73, while the customer's preferred shipping method and telephone number are shown in the fields of part 79 of screen 73. Also shown in field 81 of screen 73 is an indication of the customer's preference to receive by mail a paper catalog from the catalog company. At step 54 of FIG. 2B, the customer decides whether the displayed information is correct. If it is not, the sequence for creating the checkout settings returns to step 44 to allow the customer to correct whatever displayed information is erroneous. If it is correct, then at step 70 of FIG. 2D, web server 12 displays the customer's Custom Catalog page 83, as shown in FIGS. 6A and 6B. It should be understood that additional information beyond that shown in FIG. 5B could be used in connection with the present invention.

If the customer has previously set up his checkout/website settings, then at step 36 of FIG. 2A the customer decides whether he remembers his password for accessing his Custom Catalog. If he does, then at step 38 the customer enters his password and e-mail address. The second option 45 shown in FIG. 4A allows the customer to enter his e-mail address in field 51 and his associated password in field 53 so that he can access his Custom Catalog. After entering his e-mail address and password, the customer clicks the button 55 which initiates step 40 in FIG. 2A in which the web server 12 compares the customer's e-mail address and password with the e-mail addresses and passwords stored in files 15 and 16 resident in server computer 10. At step 42, web server 12 determines whether or not the e-mail address and password entered by the customer match any of those stored in files 15 and 16. If they do, at step 70, web server 12 displays the customer's Custom Catalog page. If at step 42, web server 12 determines that a match has not been found, then at step 56 of FIG. 26, web server 12 displays to the customer an incorrect login message 59, as shown in FIG. 4B. At this point, in step 58 of FIG. 2C, the customer decides whether to continue attempting to access his Custom Catalog. If he decides to not continue, he ends his attempt at step 60. If he does decide to continue, then the customer must decide at step 62 whether to confirm his password. If he does not, then at step 68 he can try re-entering his e-mail address in field 49 and his password in field 51 shown in FIG. 4B. When the customer again clicks button 53, the web server 12 again compares the entered e-mail address and password with the e-mail addresses and passwords stored in files 15 and 16 on computer 10. Here again, web server 12 at step 42 of FIG. 2A determines whether a match has been found. If it has not, then an incorrect login attempt message 59 is again displayed, as shown in FIG. 4B.

Figure 2C:
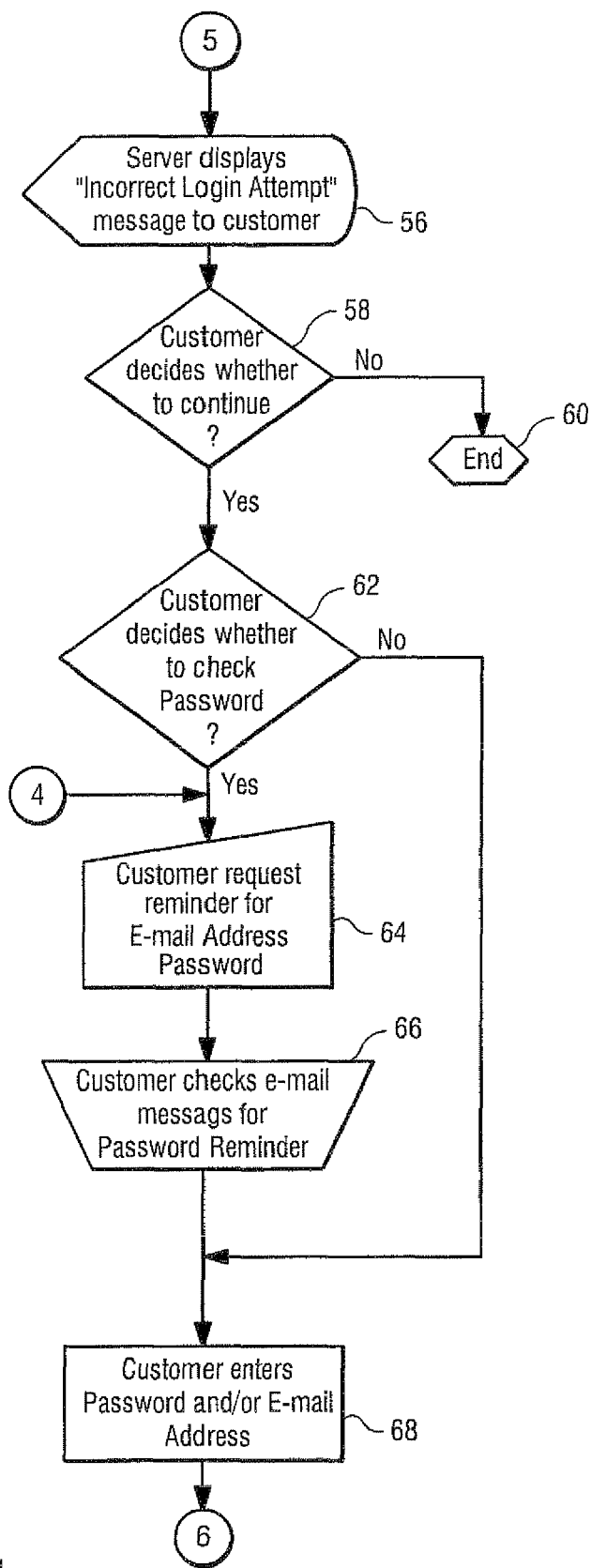

If a customer is not able to recall his password, and he wishes to check the password, at step 64 of FIG. 2C the customer can request that he be sent a reminder for his password. The request is implemented by the customer entering in field 55 shown in FIG. 4B his e-mail address and clicking the button 57 for sending the request for the reminder. At that point, web server 12 retrieves from file 17 the password reminder corresponding to the e-mail address entered by the customer in field 55. Web server 12 then implements a transmission of the reminder to the e-mail address entered by the customer in field 55. At step 66, the customer checks his e-mail on his computer 19 for a message from web server 12 providing his password reminder phrase. The reminder is typically a word phrase that assists the user in recalling his password. The reminder can, of course, be something other than a word phrase, such as a combination of letters and numbers, that assist the customer to recall his password. Assuming that the customer does recall his password, at step 68 of FIG. 2C, the customer then enters the his e-mail address and password in the fields 49 and 51 of page 41 shown in FIG. 4B, and then clicks the button 53 to again initiate at step 40 of FIG. 2A a comparison by web server 12 of the entered e-mail address and password to the e-mail addresses and passwords stored in files 15 and 16 on server computer 10. If a match is found, the customer is transferred to web page 83 shown in FIGS. 6A and 6B where the customer's Custom Catalog 85 is displayed. The customer's Custom Catalog 85 is created and then stored in file 18 of server computer 10. Thereafter, when a customer requests his Custom Catalog, it is retrieved from file 18.

Referring now to FIG. 6A, when the customer's Custom Catalog 85 is first created, it typically will not include any selected products. Custom Catalog 85 does include a field 87 with the name of the customer and an indication that the display 85 is the customer's Custom Catalog. Catalog 85 also includes a number of fields relating to the products selected by the customer to be included in his Custom Catalog 85. There is a field 89 on which a customer can click to delete a product previously included in Custom Catalog 85. The fields also include a catalog number field 91, a description field 93 of products included in the Custom Catalog 85, price field 95 of included products, and a quantity field 97 of the product selected.

FIG. 6B shows an update of Custom Catalog 85 that includes a number of products that have been selected by the customer. A further field 99 included in Custom Catalog 85 identifies the types of products listed in the Catalog. In the case of Catalog 85 shown in FIG. 6B, one field 120 of product types is identified as "wood specialties/toy parts". Under this field is listed three different products 121.

Custom Catalog 85 shown in FIG. 6B also includes a series of "Xs" 100 that are part of delete field 89. If a customer decides at step 72 of FIG. 2D to delete one or more products from his Custom Catalog 85, the customer at step 74 clicks on the Xs 100 associated with the products to be deleted. Conversely, if a customer is interested in purchasing a particular product included in Custom Catalog 85, he can enter the desired number of such product in field 101 and include it in his purchase checkout by clicking on the basket symbol 102 also included in Custom Catalog 85 for each product.

Figure 2D:
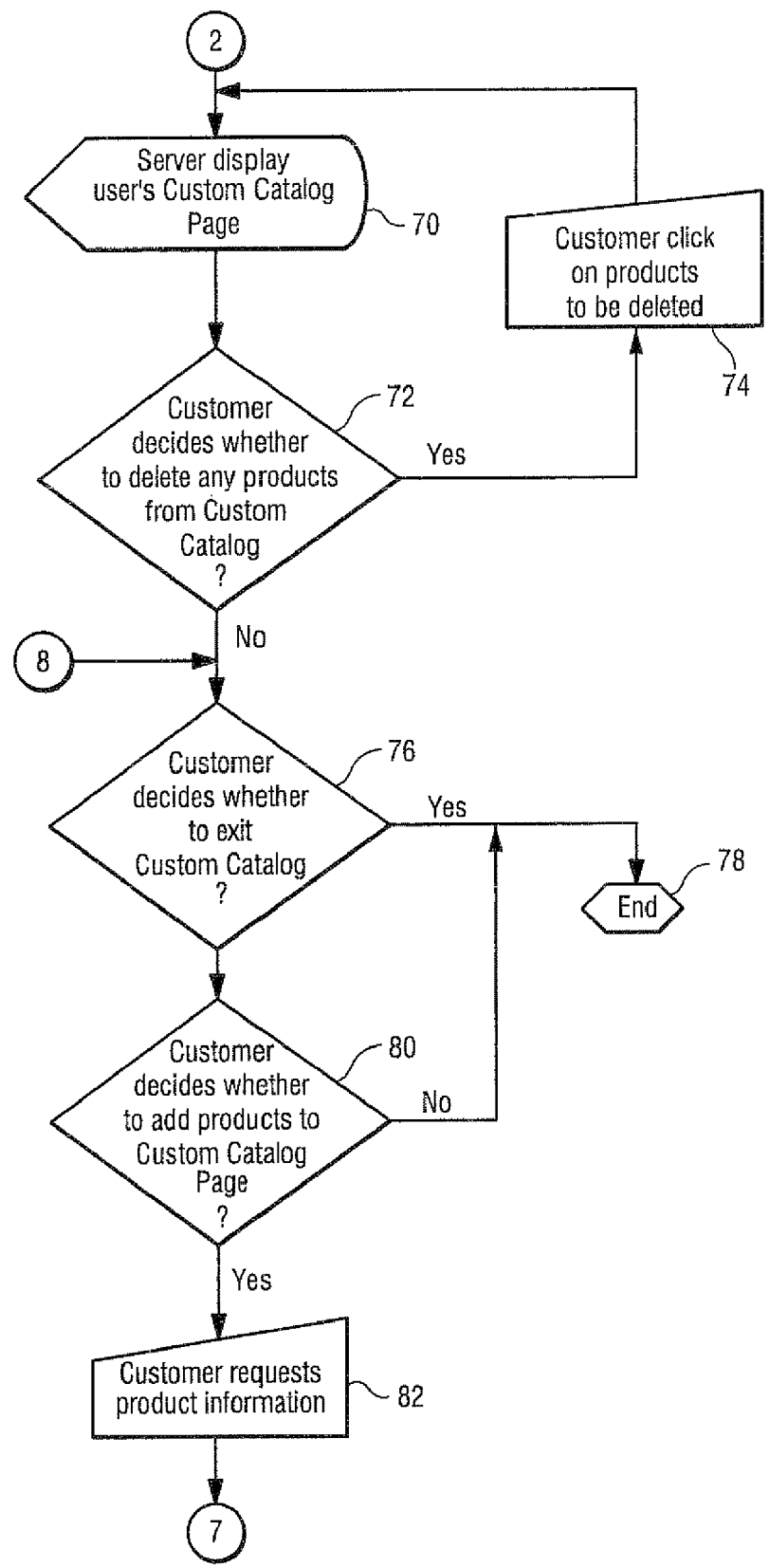
Figure 2E:
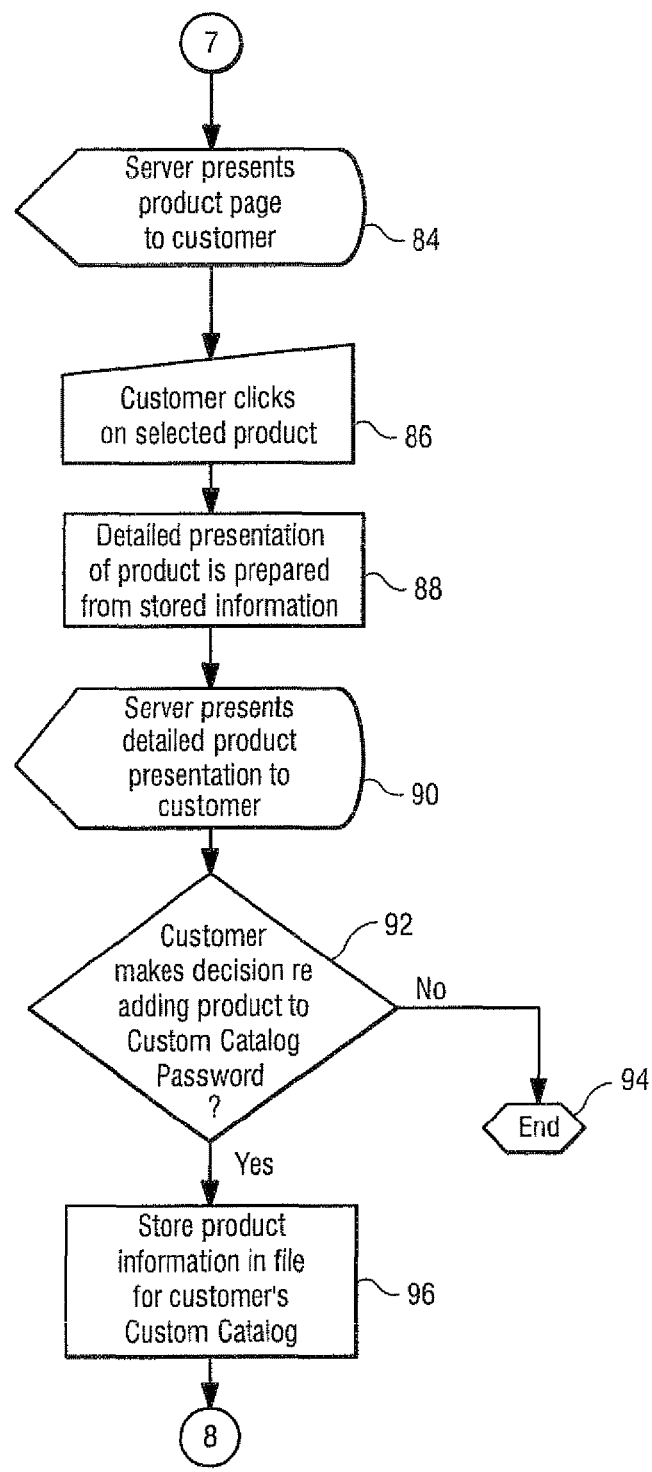

At step 76 of FIG. 2D, the customer decides whether to exit his Custom Catalog, or at step 80 whether to add products to the Custom Catalog. If the customer decides to exit his Custom Catalog or not add products to his Custom Catalog, then at step 78 he ends his use of this feature. If at step 80 the customer decides to add products to his Custom Catalog 85, then at step 82 the customer requests product information. In the embodiment of Custom Catalog 85 shown in FIG. 6B, the customer has a number of options for requesting product information. These options are the hyperlinks 33 at the top of page 83 which include a hyperlink 98 for browsing print catalogs offered by the catalog company. The print catalogs are reproduced on the catalog company's website. When the customer clicks on hyperlink 98, he is presented with page 103 shown in FIG. 7. Included in page 103 is a field 104 for displaying the most recent catalog offered by the catalog company. Of course, a different catalog can be displayed in screen 104. Also shown in web page 103 are a series of picture hyperlinks 105 that identify and allow a customer to select other catalogs offered by the catalog company. If the customer wishes to change the catalog shown in field 104, he clicks on the picture hyperlink in field 105 corresponding to the catalog in which he is interested. Once the customer has selected a desired catalog and that catalog appears in field 104, the customer can then begin to view the pages of the catalog by clicking on the word phrase hyperlink 122 for selecting pages from the catalog.

Figure 8A:
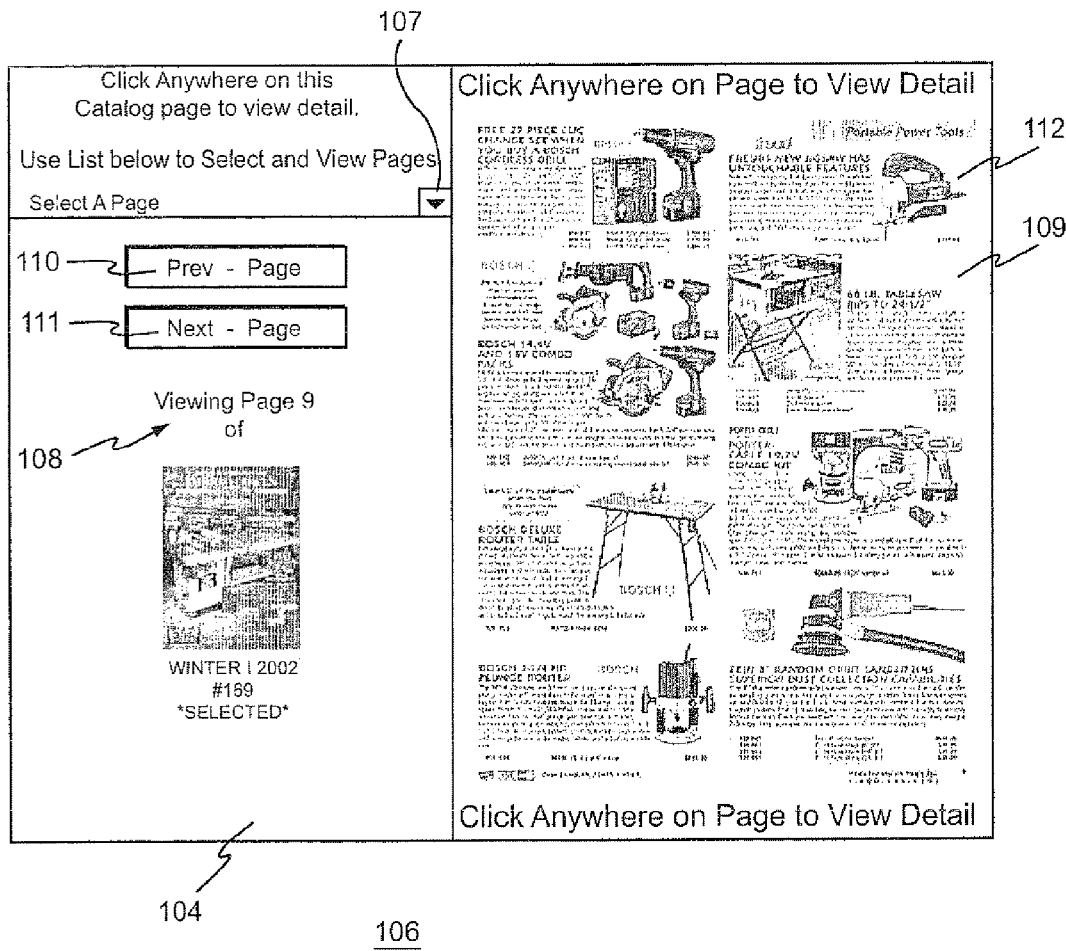
FIG. 8A is a sample of a low resolution image catalog page requested using the requesting web page of FIG. 7.

Referring now to FIG. 8A, another web page 106 of the catalog company's website displays a selected catalog page 109 for the catalog which can be changed by clicking on the button 107 for selecting a page from a drop down menu or by clicking on the "previous page" button 110 or the "next page" button 111 appearing in field 104. At step 84 of FIG. 2E, web server 12 presents page 109 of the selected catalog. Page 109 is a low resolution display of the page of the catalog. If a customer wishes to see further information regarding a particular product displayed on page 109, at step 86, he clicks on the pictured hyperlink 112 for the product. At step 88, web server 12, prepares a detailed presentation of the selected product. This presentation is created from files stored in computer 10. At step 90, web server 12 presents to the customer a detailed product presentation. This presentation corresponds to the customer being transferred to web page 113, which is a high resolution image of the selected product. The high resolution shown on web page or detailed description 113 includes a high resolution picture 114 of the product, a description 115 of the product, and a title 116 associated with the description of the product. Also included in web page 113 are a series of fields 117 that include a catalog number for the product, a brief description of the product, a brand name for the product, a model number for the product, an indication of the number of the products on hand at the catalog company, and pricing for the product. As noted above, a system and method for providing low resolution catalog pages and higher resolution descriptions of products displayed on the low resolution catalog pages is described in co-pending application Ser. No. 10/004,107, filed Dec. 6, 2001.

Figure 8C:
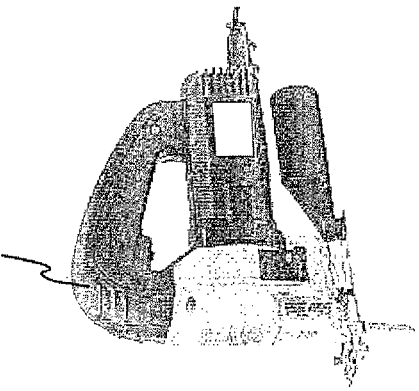
FIG. 8C is a detailed presentation of a selected one of the products shown on the low resolution image catalog page of FIG. 8A with an indication that a product has been selected to be included in the customer's Custom Catalog.

The fields 117 also include, among other things, a field 102 for purchasing the product and a field 118 for adding the product to the customer's Custom Catalog 85. If at step 92 of FIG. 2E, the customer does not decide to add the product to his Custom Catalog 85, at step 94 he ends his use of the Custom Catalog feature. If the customer does decide to add the product to his Custom Catalog 85, he clicks on field 118, which results in a "checkmark" 119 being displayed in field 118, as shown in FIG. 8C. This product information is at step 96 stored in the customer's Custom Catalog file maintained in files 18 of server computer 10.

Referring again to FIG. 6B, if a customer wishes to view detailed information about a product included in his Custom Catalog 85, he can click on the Catalog Number hyperlink 123, which will result in a detailed description such as description 113A shown in FIG. 9 being displayed. Detailed description 113A includes a high resolution picture 114A of the product, a description 115A of the product and a title 116A associated with the product description 115A. Description 113A includes the same fields 117 shown in description 113 of FIG. 8C. Included in these fields is field 118 with a checkmark 119 showing that the customer has included the product in his Custom Catalog 85. A description 122 of the product is listed in the customer's Custom Catalog 85 shown in FIG. 6B. Once the customer has added the product to his Custom Catalog 85, at step 76 shown in FIG. 2D, the customer decides whether to exit the Custom Catalog feature of the catalog company's website. If he does, he ends the feature at step 78. If he does not, at step 80 he decides whether to add additional products to his Custom Catalog 85. At this point, the method described above is repeated for additional products.

FIGS. 10A and 10B show an alternative web page for a customer's Custom Catalog 85A. In the Custom Catalog 85A shown in FIGS. 10A and 10B, there is only one type of product listed, but several different products listed. As noted above, if a customer is interested in purchasing a particular product included in his Custom Catalog 85A, he can enter the desired number of such product in field 101 and include it in his purchase checkout by clicking on the appropriate symbol for adding the product to his basket. In the embodiment of Custom Catalog 85A shown in FIG. 10A, rather than include the basket symbol 102 shown in FIG. 6B, there is provided an "ADD" button 126 that a customer can click to add a desired product to his checkout basket. Clicking on button 126 causes web server 12 to display web page 130 shown in FIGS. 11A and 11B. The only difference between web page 130 in FIG. 11A and FIG. 11B is the number 134 versus 134A of the product 131 displayed in page 130. Thus, if a customer desires to purchase the product 125 shown in FIGS. 10A and 10B, he would specify the quantity in field 101 and click on the add button 126. If no quantity is specified in field 101, as shown in FIG. 10B, the default quantity will be "1", as shown in field 134 of FIG. 11A. At the price shown in field 133 for product 131 shown in FIG. 11A, there is a first extended price that is the same as the unit price as shown in field 135, resulting in a first order subtotal 136, also shown in FIG. 11A. If the customer chooses to increase the quantity to "2", as shown in field 134A of FIG. 11B, a revised extended price will result in field 135A of FIG. 11B that is twice the unit price shown in field 133. This, in turn, will result in a revised order subtotal amount 136A. Thereafter, the customer can initiate a purchase of his selected products by clicking the checkout button 138 provided in page 130. Alternatively, the customer can continue browsing the catalog company's website by clicking button 137 for this purpose.

The Custom Catalog feature of the present invention allows customers browsing a catalog company's website to identify and select products that the customer regularly buys or on which the customer needs to check on a frequent basis. The feature allows a customer to save time when checking on product pricing and availability.

Although the present invention has been described in terms of a particular embodiment, it is not intended that the invention be limited to that embodiment. Modifications of the disclosed embodiment within the spirit of the invention will be apparent to those skilled in the art. The scope of the present invention is defined by the claims that follow.

What is claimed is:

1. A method of creating, accessing and using an electronic customer product catalog on a computer website, the method comprising:

publishing a master product catalog on the website, wherein the product catalog includes information regarding individual products and purchase prices of the individual products;

creating a first customer account on the website, wherein the customer account enables a first customer to create a first custom catalog unique to the first customer account accessible by logging onto the first customer account;

while logged on the first customer account, selecting a plurality of the individual products listed in the master product catalog and including the selected individual products in the first custom catalog;

publishing the first custom catalog on the website, and receiving at the website selections made from the first custom catalog of at least one product to be purchased, and receiving orders at the website of the selected product.

2. A method as in claim 1 wherein the first customer account includes contact and billing information for the first customer.

3. A method as in claim 1 wherein including one of the selected individual products in the first custom catalog includes creating a link to the description of the selected product in the master product catalog and storing the link in the first custom catalog.

4. A method as in claim 1 wherein the first custom catalog includes a product ordering field and the ordering of the product includes entering a quantity of the selected product to be purchased in the ordering field.

5. A method as in claim 1 wherein the first custom catalog includes a product ordering field for each of the products listed in the first custom catalog and the ordering of the product includes entering a quantity of the selected product to be purchased in the ordering field corresponding to the product to be ordered.

6. A method as in claim 1 further comprising:
creating a second customer account on the website, wherein the second customer account includes customer contact information and a second custom catalog unique to a second customer, wherein the second custom catalog is accessible by logging onto the second customer account and is inaccessible from the first customer account;
while logged onto the second customer account, selecting products from the master product catalog to be included in the second custom catalog;
while subsequently logged onto the second customer account, selecting additional products from the master product catalog and adding the additional selected products to the second custom catalog; and
while subsequently logged onto the second customer account, using the second custom catalog to purchase at least one product listed in the second custom catalog.

7. A method as in claim 6 wherein the first and second custom catalogs are electronic files stored on a web server computer supporting the website.

8. A method as in claim 6 wherein creating the first and second customer accounts includes entering billing information for the first and second customer, respectively, to be used in purchasing the products.

9. A method as in claim 6 wherein the master product catalog is accessible while logged on either the first and second customer accounts.

10. A method as in claim 6 wherein the master product catalog is a plurality of master product catalogs, and each of said master product catalogs includes presentations on products that may be added to the customer catalog.

11. A method as in claim 1 wherein the first custom catalog includes information regarding products limited to information regarding the selected products in the first custom catalog.

12. A method as in claim 1 wherein the first custom catalog comprises at least one data file defining a custom catalog page of a website.

13. A method as in claim 12 wherein the data file of the first custom catalog includes at least one field on the custom catalog page to receive information regarding the selected products.

14. A method as in claim 12 wherein the data includes at least one field on the custom catalog page to receive information regarding ordering the selected products.

15. A method of browsing via a telecommunications network selected products included in an electronic product catalog displaying a plurality of products, the method comprising:
storing in a first device connected to said network a first file containing information provided by at least one customer for identifying the at least one customer and a second file containing information for identifying at least one product of interest to said customer, the at least one product of interest having been directly selected by said customer browsing the plurality of products displayed in the electronic product catalog for inclusion in the second file;
receiving from a second device connected to said network at least one request for said second file and said customer identifying information;
comparing in said first device said transmitted customer identifying information to said stored customer identifying information, and
if said information matches, transmitting from said first device to said second device said second file.

16. The method of claim 15 further comprising:
for each product identified by information contained in said second file, storing in said first device a third file containing a detailed presentation of said product;
receiving from said second device at least one request for said detailed presentation of said product; and
transmitting from said first device, in response to said at least one request, said requested detailed product presentation.

17. The method of claim 16 further comprising receiving from said second device at least one request to order said product corresponding to said detailed product presentation.

18. The method of claim 16 further comprising receiving from said second device a request that the product described by said detailed product presentation be added to said second file.

19. The method of claim 15 further comprising:
for each product displayed in said electronic product catalog, storing in said first device a fourth file containing a detailed presentation of said product;
receiving from said second device at least one request for said detailed presentation of said product;
transmitting from said first device in response to said at least one request said requested detailed product presentation; and
receiving from said second device a request that the product described by said detailed product presentation be added to said second file.

20. The method of claim 15 further comprising receiving from said second device a request that at least one product included in said second file be deleted from said second file.

21. The method of claim 15 further comprising for each page of said product catalog, storing in said first device a third file containing a low resolution scan of said catalog page;
receiving from said second device connected to said network at least one request for at least one page of said product catalog;
transmitting from said first device in response to said at least one page request said low resolution scan file of said requested catalog page;
for each product displayed on said low resolution scan of said requested catalog page, storing in said first device a plurality of fourth files from which a detailed presentation of said product is prepared;
receiving from said second device at least one second request for a selected one of said detailed product presentations; and
transmitting from said first device in response to said at least one second request said requested detailed product presentation file.

22. The method of claim 21 wherein the receiving of said least one request for at least one page of said product catalog comprises receiving a request for a specials page describing products which are on sale.

23. The method of claim 22 wherein the receiving of said at least one second request for said detailed product presentation is performed by a browser program stored on said second device.

24. The method of claim 22 wherein the transmission of said detailed product presentation file is performed by a server program stored on said first device.

25. The method of claim 21 further comprising:
receiving from said second device a request to establish a custom product catalog;
transmitting from said first device a request for said information for identifying said customer; and
storing in said first file in said first device said customer identifying information.

26. The method of claim 21 further comprising:
transmitting from said first device a request for information for shipping to said customer;
receiving from said second device said requested shipping information; and
storing in said first file in said first device said shipping information.

27. The method of claim 21 wherein the customer identifying information further includes a reminder for said customer's password.

28. The method of claim 15 wherein the customer identifying information includes an e-mail address and a password.

29. A method of browsing a custom catalog of products selected from a plurality of products included in a product catalog displayed on a website via the internet, the method comprising:
storing in a first device connected to the internet a first file containing information provided by a plurality of customers for identifying the plurality of customers and a second file containing a plurality of custom catalogs, each custom catalog containing information identifying for a corresponding one of said customers at least one product of interest to said corresponding customer, the at least one product of interest included in the custom catalog having been directly selected by said corresponding customer by browsing the plurality of products included in the product catalog displayed on the website for inclusion in the custom catalog;
receiving from a second device connected to the interne at least one request for one of said custom catalogs corresponding to a customer browsing the product catalog;
transmitting from said first device in response to said custom catalog request a request for information identifying said browsing customer;
receiving from said second device in response to said browsing customer identification request said browsing customer identifying information;
comparing in said first device said browsing customer identifying information with said stored customer identifying information; and
when a match is obtained, transmitting from said first device to said second device said custom catalog corresponding to said browsing customer.

30. The method of claim 29 further comprising:
for each different product identified by information contained in said plurality of custom catalogs, storing in said first device a third file containing a detailed presentation of said product;
receiving from said second device at least one request for said detailed presentation of said product; and
transmitting from said first device in response to at least one said request said requested detailed product presentation.

31. A method according to claim 30 further comprising receiving from said second device a request that the product described by said detailed product presentation be added to said browsing customer's custom catalog.

32. A method according to claim 31 further comprising receiving from said second device at least one request to order said product corresponding to said detailed product presentation.

33. A system for browsing, via a telecommunications network, products selected from a plurality of products included in an electronic product catalog, the system comprising:
a first device connected to said network for storing a first file containing information provided by at least one customer for identifying the at least one customer and a second file containing information for identifying at least one product of interest to said customer, the at least one product of interest having been directly selected by said customer browsing the plurality of products displayed in the electronic product catalog for inclusion in the second file;
said first device receiving a transmission from a second device connected to said network, wherein the transmission includes at least one request for said second file and said customer identifying information;
said first device comparing said transmitted customer identifying information to said stored customer identifying information; and
said first device transmitting to said second device said second file if said information matches.

34. The system of claim 33 wherein the first device further comprises for each product identified by information contained in said second file, a third file containing a detailed presentation of said product;
wherein said first device receives from the second device at least one request for said detailed presentation of said product, and said first device transmits said requested detailed product presentation.

35. The system of claim 34 wherein the first device receives from the second device at least one request to order said product corresponding to said detailed product presentation.

36. The system of claim 35 wherein the first device is a server computer and the second device is a personal computer.

* * * * *